United States Patent
Park et al.

(10) Patent No.: US 10,728,082 B2
(45) Date of Patent: *Jul. 28, 2020

(54) APPARATUS AND METHOD FOR DELIVERING TRANSPORT CHARACTERISTICS OF MULTIMEDIA DATA

(71) Applicants: Samsung Electronics Co., Ltd., Suwon-si, Gyeonggi-do (KR); UNIVERSITY-INDUSTRY COOPERATION GROUP OF KYUNG HEE UNIVERSITY, Yongin-si, Gyeonggi-do (KR)

(72) Inventors: Kyung-Mo Park, Seoul (KR); Sung-Oh Hwang, Yongin-si (KR); Doug-Young Suh, Seongnam-si (KR); Yong-Hun Lee, Suwon-si (KR)

(73) Assignees: Samsung Electronics Co., Ltd., Suwon-si (KR); University-Industry Cooperation Group of Kyung Hee University, Yongin-si, Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/168,463

(22) Filed: Oct. 23, 2018

(65) Prior Publication Data

US 2019/0058624 A1    Feb. 21, 2019

Related U.S. Application Data

(63) Continuation of application No. 13/944,265, filed on Jul. 17, 2013, now Pat. No. 10,135,666.

(30) Foreign Application Priority Data

Jul. 17, 2012  (KR) .................. 10-2012-0077856

(51) Int. Cl.
  *H04L 29/06*     (2006.01)
  *H04L 1/18*      (2006.01)
  (Continued)

(52) U.S. Cl.
  CPC ...... *H04L 29/06482* (2013.01); *H04L 1/1887* (2013.01); *H04L 65/607* (2013.01);
  (Continued)

(58) Field of Classification Search
  CPC . H04L 29/06482; H04L 65/607; H04L 65/80; H04W 8/26; H04W 28/06
  (Continued)

(56) References Cited

U.S. PATENT DOCUMENTS

2003/0028598 A1   2/2003  Moller et al.
2004/0039834 A1   2/2004  Saunders et al.
(Continued)

FOREIGN PATENT DOCUMENTS

CN    1360767 A    7/2002
CN    1206828 C    6/2005
(Continued)

OTHER PUBLICATIONS

Working Draft for MPEG Media Transport (Year: 2012).*
(Continued)

*Primary Examiner* — Jae Y Lee
*Assistant Examiner* — Jean F Voltaire
(74) *Attorney, Agent, or Firm* — Jefferson IP Law, LLP

(57) ABSTRACT

There are provided a method and apparatus for delivering transport characteristics of multimedia data. According to an aspect of the present invention, transport characteristics of media data that can be divided in a unit of a Media Processing Unit (MPU) are created in a unit of a predetermined number of MPUs, the created transport characteristics and a flag indicating presence or absence of the created (Continued)

transport characteristics are inserted into the media data, and the resultant media data is delivered. Accordingly, by using transport characteristics in units of media data unit groups, each media data unit corresponding to a short time length, it is possible to effectively control Quality of Service (QoS) in a dynamically changing transport environment, like a mobile network.

4 Claims, 3 Drawing Sheets

(51) Int. Cl.
| | |
|---|---|
| H04W 8/26 | (2009.01) |
| H04N 21/236 | (2011.01) |
| H04N 21/2381 | (2011.01) |
| H04N 21/84 | (2011.01) |
| H04L 1/00 | (2006.01) |
| H04W 28/06 | (2009.01) |

(52) U.S. Cl.
CPC ......... *H04L 65/80* (2013.01); *H04N 21/2381* (2013.01); *H04N 21/23614* (2013.01); *H04N 21/84* (2013.01); *H04W 8/26* (2013.01); *H04L 1/0083* (2013.01); *H04L 1/1822* (2013.01); *H04W 28/06* (2013.01)

(58) Field of Classification Search
USPC .......................................................... 370/389
See application file for complete search history.

(56) References Cited

U.S. PATENT DOCUMENTS

| | | | |
|---|---|---|---|
| 2004/0057412 A1 | 3/2004 | Curcio et al. | |
| 2005/0094611 A1* | 5/2005 | Cheong ................... | H04L 47/14 370/342 |
| 2005/0094617 A1 | 5/2005 | Lee | |
| 2005/0259613 A1 | 11/2005 | Garudadri et al. | |
| 2006/0177200 A1 | 8/2006 | Deutmeyer et al. | |
| 2008/0209485 A1 | 8/2008 | Emura | |
| 2009/0196225 A1 | 8/2009 | Avila et al. | |
| 2009/0317059 A1 | 12/2009 | Chen et al. | |
| 2011/0026526 A1* | 2/2011 | Emura ................. | H04N 21/242 370/392 |
| 2011/0119395 A1 | 5/2011 | Ha et al. | |
| 2011/0164664 A1 | 7/2011 | Torsner et al. | |
| 2011/0235510 A1 | 9/2011 | Avila et al. | |
| 2011/0255558 A1 | 10/2011 | Hwang et al. | |
| 2012/0147902 A1 | 6/2012 | Kim et al. | |
| 2014/0036999 A1* | 2/2014 | Ryu ....................... | H04N 19/50 375/240.12 |

FOREIGN PATENT DOCUMENTS

| | | |
|---|---|---|
| CN | 1863314 A | 11/2006 |
| CN | 1977516 A | 6/2007 |
| CN | 101697634 A | 4/2010 |
| CN | 102484813 A | 5/2012 |
| JP | 2004-015551 A | 1/2004 |
| JP | 2008-141311 A | 6/2008 |
| JP | 2008-530855 A | 8/2008 |
| JP | 2011-523287 A | 8/2011 |
| JP | 2011-250310 A | 12/2011 |
| JP | 2013-528997 A | 7/2013 |
| KR | 10-2006-0065435 A | 6/2006 |
| KR | 10-2012-0069795 A | 6/2012 |
| KR | 10-2019-0018655 A | 2/2019 |
| WO | 2011/132937 A2 | 10/2011 |

OTHER PUBLICATIONS

Kyunghee University; H.323 based Video Services over ATM Network; ITU—Telecommunications Standardization Sector, Study Group 16, Video Coding Experts Group; Document Q15-F-28; Jul. 3-6, 1998, Seoul, KR.

ISO/IEC; Information technology—Coding of audio-visual objects—Part 2:Visual; International Standard; ISO/IEC 14496-2; Jun. 1, 2004; Switzerland.

Park et al., Working Draft for MPEG Media Transport, ISO/IEC WD MPEG Media Transport, International Organisation for Standardisation ISO/IEC/JTC1/SC29/WG11 Coding of Moving Pictures and Audio, Apr. 2012, pp. i-74, ISO/IEC JTC1/SC29/WG11/N12690, XP0300019164.

Systems/MMT, Technologies under Consideration (TuC) for MMT, International Organisation for Standardisation ISO/IEC JTC1/SC29/WG11 Coding of Moving Pictures and Audio, Jul. 2011, ISO/IEC JTC1/SC29/WG11 N12170, XP030018665.

Korean Office Action dated Aug. 13, 2019, issued in Korean Patent Application No. 10-2019-0080726.

Chinese Examination report dated May 28, 2020, issued in Chinese Application No. 201810569385.1.

* cited by examiner

APPARATUS AND METHOD FOR DELIVERING TRANSPORT CHARACTERISTICS OF MULTIMEDIA DATA

PRIORITY

This application is a divisional application of prior application Ser. No. 13/944,265, filed on Jul. 17, 2013, which claimed priority under 35 U.S.C. § 119(a) of a Korean patent application number 10-2012-0077856, filed on Jul. 17, 2012, in the Korean Intellectual Property Office, the disclosure of which is incorporated by reference herein in its entirety.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) UNIVERSITY-INDUSTRU COOPERATION GROUP OF KYUNG HEE UNIVERSITY

BACKGROUND OF THE INVENTION

Field of the Invention

The present invention relates generally to a method and apparatus for delivering multimedia data packets in a broadcasting and communication system, and more particularly, to a method and apparatus for delivering transport characteristics of multimedia data in units of Media Processing Unit (MPU) groups for Quality of Service (QoS) control when multimedia content constituted with one or more MPUs is serviced in a network environment dynamically changing over time in a broadcasting and communication system that supports a multimedia service based on an Internet protocol.

Description of the Related Art

IEEE802.16 (WIMAX), IEEE802.11e (WiFi TXOP), 3rd Generation Partnership Project Universal Mobile Telecommunication System (3GPP UMTS), and 3GPP Long Term Evolution (LTE) have a function of reserving resources and guaranteeing the reserved resources. Real-time multimedia services use a resource reservation protocol in order to guarantee QoS. As a representative example, Internet Engineering Task Force (IETF) has defined parameters required for reserving network resources between user terminals and a content server in a Resource reSerVation Protocol (RSVP) which is a resource reservation protocol.

FIG. 1 illustrates a process of specifying data with a Variable BitRate (VBR) as double leaky bucket parameters.

VBR traffic is expressed as double leaky buckets using four parameters Rg, Rp, Bp, and B included in Traffic specification Tspec. Rg is an average bitrate, and no overflow occurs when data is stored in a buffer although the bitrate of the data momentarily exceeds the bitrate Rg. A required buffer size is designated as Bg in advance. Likewise, a peak bitrate Rp is also reserved. Under an assumption that a peak bitrate is maintained during a period in which a packet is transported, a buffer size Bp for a peak bitrate Rp can be set to the maximum size of Service Data Unit (SDU). The maximum size of SDU is generally expressed as Maximum Transfer Unit (MTU).

Table 1 shows four double leaky bucket parameters used in various protocols.

TABLE 1

|    | IETF RSVP, IEEE802.11e 'tspec' | IEEE802.16 (WIMAX) | 3GPP UMTS & LTE | MPEG-4 OD | ATM |
|----|--------------------------------|--------------------|-----------------|-----------|-----|
| Rp | p | Min. reserved traffic rate | Maximum bitrate (4 B) | avgBitrate | PCR |
| Bp | M | SDU size | Maximum SDU size | MAX_AU_SIZE | CDVT |
| Rg | r | Max. sustained traffic rate | Guaranteed bitrate (4 B) | AverageBitRate | SCR |
| Bg | b | Maximum Latency | k*Maximum SDU | bufferSizeDB | BT |

Accordingly, creating transport characteristics of multimedia using double leaky bucket parameters is effective in view of compatibility with other protocols. Generally, the resource reservation protocol is executed when a service session for providing a multimedia service is established, and it is assumed that while a service is maintained, the protocol is used by end-to-end systems on a network that transports data with respect to entire multimedia content. However, end-to-end resource reservation for a service cannot be embodied in general open Internet environments. Furthermore, a core network achieves stable broadband transmission, however, at or near network end points, a problem may occur due to resources sharing between many users. Particularly, in a wireless or mobile communication network, a network resource environment changes dynamically due to various factors, such as users' migration, interference, or the like.

FIG. 2 illustrates Signal to Interference plus Noise Ratio (SINR) measured for 10 minutes in an IEEE802.16 network environment.

The Moving Picture Experts Group (MPEG) is doing standardization of MPEG Media Transport (MMT) technology, and the MMT technology provides transport characteristics in a unit of asset through Asset Delivery Characteristics (ADC) in order to embody a function of reserving a resource for a multimedia service and guaranteeing the reserved resource and a function of constructing transport characteristics of multimedia data in a dynamic network environment and transmitting/receiving the transport characteristics.

In the MMT technology, an asset is logical data entity, and constructed with one or more Media Processing Units (MPUs). The asset is a greatest data unit to which configuration information and transport characteristics of multimedia are applied.

The ADC is used to guarantee QoS upon transmission of MMT assets, and the ADC specifies parameters for a specific transmission environment and parameters for QoS. By using the ADC, a service provider can configure a network resource in consideration of media characteristics required for transmission when reserving a resource according to network environment configuration. However, in a dynamic network environment where SINR varies in real-time, it is difficult to guarantee the amount of resource reserved using existing RSVP or the like when a service session started. Furthermore, in a mobile environment, when a user moves into the coverage area of another base station, resource reservation should be again performed. For these reasons, when a resource is reserved in order to guarantee QoS of a multimedia service in a dynamic network environment, it will be effective to reserve a resource in units of shorter lengths than in resource reservation for entire content. Accordingly, there is a need to propose a method of inserting additional information for controlling QoS for MPUs in a unit of a MPU group including a plurality of MPUs each of which is a small unit constituting media content.

SUMMARY OF THE INVENTION

Problems to be Solved by the Invention

An aspect of the present invention is to provide a method and apparatus for effectively guaranteeing Quality of Service (QoS) of a multimedia service by providing transport characteristics of media data that can be temporally divided in a dynamic network environment.

Means for Solving Problems

According to an exemplary embodiment of the present invention, there is provided a method of delivering transport characteristics of multimedia data in a system that supports a multimedia service based on an Internet protocol. The method includes creating transport characteristics of media data that is dividable in a unit of a Media Processing Unit (MPU), in a unit of a predetermined number of MPUs; and inserting the created transport characteristics and a flag indicating presence or absence of the created transport characteristics into the media data, and delivering the resultant media data.

According to another exemplary embodiment of the present invention, there is provided an apparatus of delivering transport characteristics of multimedia data in a system that supports a multimedia service based on an Internet protocol. The apparatus includes an encapsulator configured to create transport characteristics of media data that is dividable in a unit of a Media Processing Unit (MPU), in a unit of a predetermined number of MPUs; and a delivery unit configured to insert the created transport characteristics and a flag indicating presence or absence of the created transport characteristics into the media data, and to deliver the resultant media data.

Effects

Therefore, according to the exemplary embodiments of the present invention, by using transport characteristics in units of media data unit groups, each media data unit corresponding to a short time length, it is possible to effectively control Quality of Service (QoS) in a dynamically changing transport environment, like a mobile network.

DETAILED DESCRIPTION OF THE EXEMPLARY EMBODIMENTS

Hereinafter, exemplary embodiments of the present invention will be described in detail with reference to the accompanying drawings. Terms used in the present disclosure are currently widely used general terms selected in consideration of the functions in the exemplary embodiments; however, they may be changed according to the intention of a user or operator, the practice, or the like. Thus, it will be appreciated that terms used in the following exemplary embodiments must be construed based on definitions disclosed in the present disclosure and if not defined, the terms must be construed as meanings that are generally understood to one of ordinary skill in the art.

Transport characteristics of media data in a unit of a Media Processing Unit (MPU) group proposed in the present disclosure may be generated in a generation (capture or grab) process of content and in an encapsulation process of media data encoded in advance. Here, the MPU group represents a data unit including a plurality of MPUs, and a MPU group may be constructed with MPUs having the same characteristics (for example, the same bitrate). A method of using the transport characteristics upon transmission is as follows. An exemplary embodiment of the present invention will be, for convenience of description, described based on MPEG Media Transport (MMT) of which the Moving Picture Experts Group (MPEG) is doing standardization, however, the present disclosure is not limited to the MMT. A MMT system is divided into an encapsulation layer, a delivery layer, and a control (signaling) layer according to its function. Hereinafter, how the individual layers use transport characteristics will be described.

1) MMT Encapsulation Layer

The MMT encapsulation layer performs a function of generating transport characteristics of media data in a unit of a MPU group proposed in the present disclosure.

Figure 1:
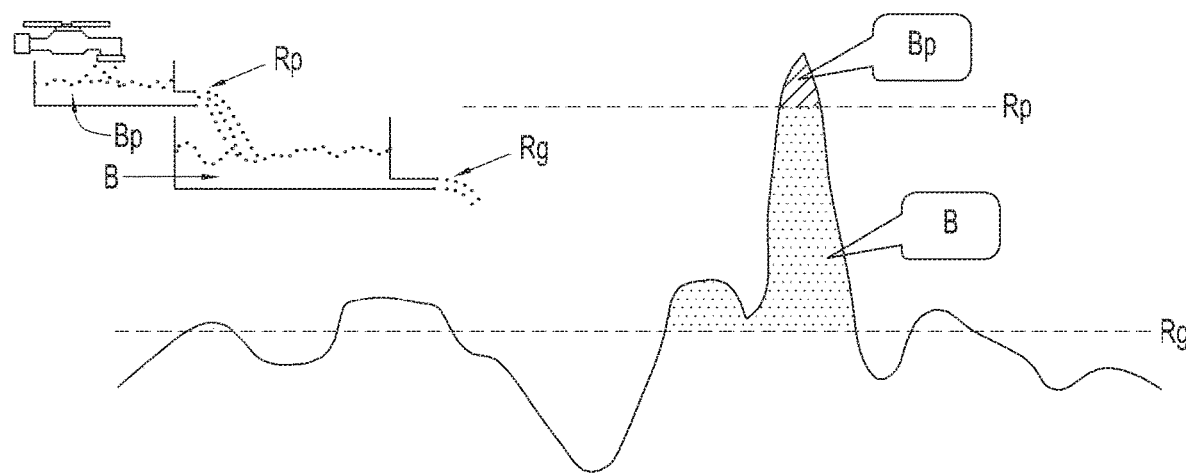
FIG. 1 illustrates a process of specifying data with a Variable BitRate (VBR) as double leaky bucket parameters.
Figure 2:
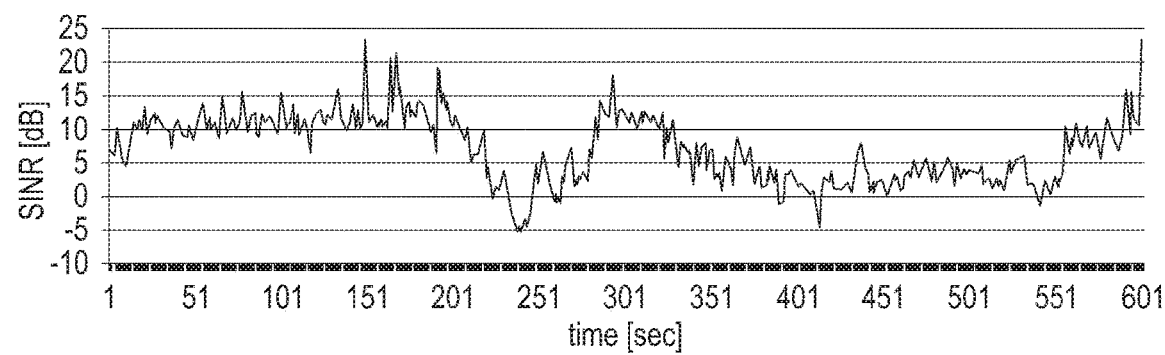
FIG. 2 illustrates Signal to Interference plus Noise Ratio (SINR) measured for 10 minutes in an IEEE802.16 network environment.
Figure 3:
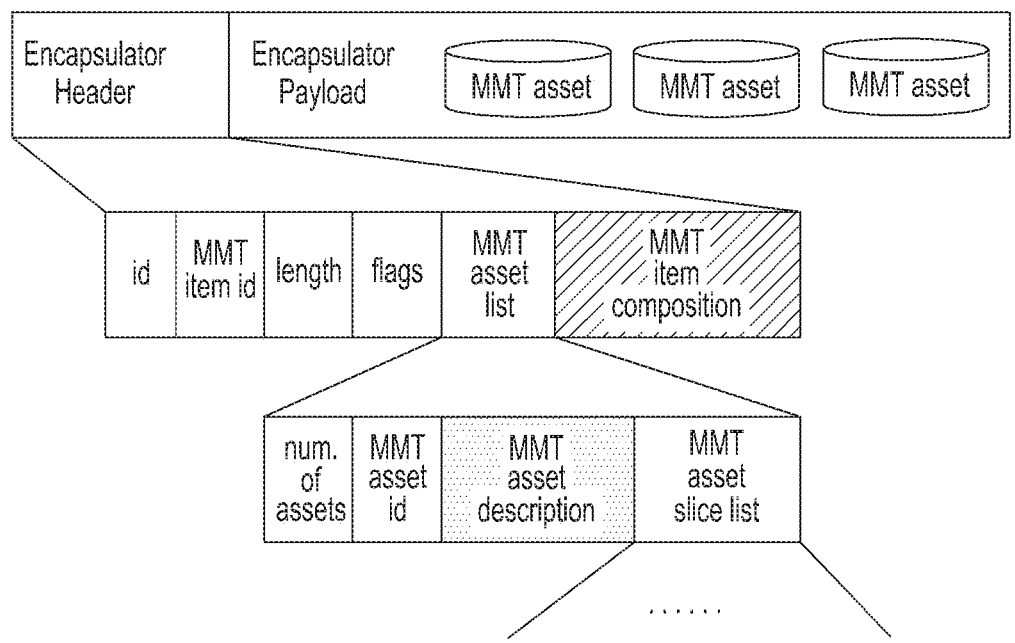
FIG. 3 illustrates a structure of a MPEG Media Transport (MMT) encapsulator header according to an exemplary embodiment of the present invention.

FIG. 3 illustrates a structure of a MPEG Media Transport (MMT) encapsulator header according to an exemplary embodiment of the present invention.

A MMT asset constructed with one or more Media Processing Units (MPUs) is a component (for example, a video component or an audio component) constructing media content. Accordingly, each MMT asset includes transport characteristics of media data. The transport characteristics for each MMT asset may be used for QoS control, resource reservation, etc. in a process of establishing a session of the corresponding MMT asset using a Resource reSerVation Protocol (RSVP) or the like. Transport characteristics in a unit of a MPU group proposed in the present disclosure is added as an identifier for identifying information that can be used for delivery and QoS control, using flags regarding one or more MPU groups constructing a MMT asset.

2) MMT Control Layer

The MMT control layer is in charge of a function of exchanging service discovery information, Quality of Experience (QoE) management information, and Digital Rights Management (DRM) information between a server and a client. When service discovery information is exchanged, a process of reserving a network resource for establishing a session may be performed, and in this case, QoS control such as resource reservation is performed using transport characteristics included in a MMT asset. As described above, since QoS control based on asset is performed in a unit of entire content, in a dynamic environment, QoS control based on a MPU group which is a smaller unit is needed.

3) MMT Transport Layer

The MMT transport layer is in charge of a function of transporting encapsulated media data packets from a server to a client and a function (for example, a cross-layer interface) of exchanging information between layers in a terminal. To do these, the MMT transport layer generates delivery packets. The MMT transport layer extracts QoS-related information that should be included in each delivery packet from transport characteristics in order to guarantee QoS of the delivery packet.

Figure 4:
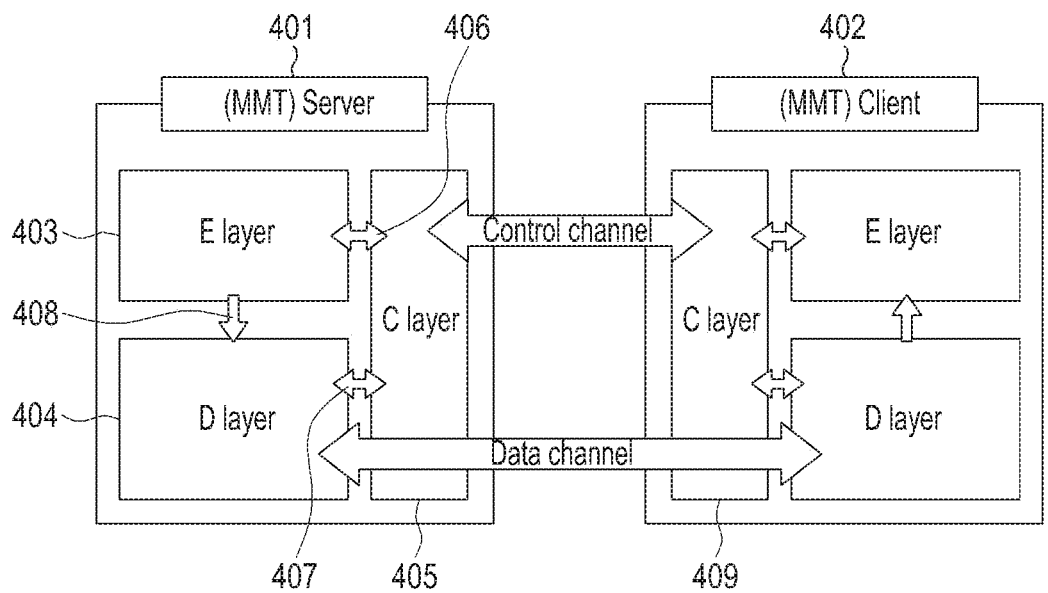
FIG. 4 is a view for describing an example of using transport characteristics for media data delivery between a MMT server and a MMT client, according to an exemplary embodiment of the present invention.

FIG. 4 is a view for describing an exemplary embodiment in which transport characteristics of media data generated by the MMT encapsulation layer are used in a media transport service.

Asset delivery characteristics of media data in a unit of a MPU group proposed in the present disclosure are generated by an encapsulation layer (E layer) 403 of a MMT server 401 and then inserted into the media data in the form of flags. The asset delivery characteristics includes information (for example, double leaky bucket parameters; bitstream_descriptor) required for resource reservation, and QoS_descriptor that is included in each delivery packet and indicates relative priority of the delivery packet. The bitstream_descriptor is transferred to the control layer (C layer) 405 (406), and then transferred to a C layer 409 of a client 402 through a signaling protocol, such as Real-Time Stream Protocol (RTSP) or Session Initiation Protocol (SIP). In the case of QoS_descriptor, if the C layer 405 transfers parsed information to a delivery layer (D layer) 404 (407), the D layer 404 may insert the parsed information into each delivery packet, and then transport the resultant delivery packet to the client 402 and an intermediate network system (not shown) through a data channel. Alternatively, it is also possible to directly access an encapsulation header of data transferred through a path 408, to parse the corresponding field to acquire information, and then to transport the acquired information. The above process is performed in units of MPU groups each corresponding to a shorter time length than an asset.

Hereinafter, syntax and semantics for transport characteristics in a unit of a MPU group according to an exemplary embodiment of the present invention will be described in detail.

Syntax for additional information for QoS control and delivery in a unit of a MPU group (or a media data unit, such as Group Of Pictures (GOP), corresponding to a shorter time length than an asset) proposed in the present invention and semantics for individual fields are shown in Table 2. As seen in Table 2, the names and sizes of the individual fields, and the kinds of variables specifying the individual fields have been selected in consideration of the functions in the exemplary embodiments of the present invention, however, they may be changed according to the intention of a user or operator, the practice, or the like. In the present disclosure, the meanings of the individual fields should be understood based on the following definitions.

TABLE 2

| Syntax | No. Of bits | Mnemonic |
|---|---|---|
| MPU_Header( ){ | | |
|     mpu_length; | | |
|     header_length; | | |
|     mpu_sequence_number; | | |
|     number_of_au; | | |
|     for(int i=0; i<number_of_au; i++){ | | |
|         au_length; | | |
|     } | | |
|     private_header_flag; | | |
|     if(private_header_flag == 1){ | | |
|         private_header_length | | |
|         private_header | | |
|     } | | |
|     MPU_delivery_characteristic_header_flag; | | |
|     if(MPU_delivery_characteristic_header_flag == 1){ | | |
|         QoS_descriptor( ){ | | |
|             loss_priority; | | |
|             delay_priority; | | |
|             class_of_service; | | |
|             hybrid_sync_indicator; | | |
|         } | | |
|         Bitstream_descriptor( ){ | | |
|             sustainable_rate; | | |
|             buffer_size; | | |
|             peak_rate; | | |
|             max_MFU_size; | | |
|             MFU_perid; | | |
|         } | | |
|     } | | |
| } | | |
| MPU_Payload( ) | | |

TABLE 3

| Element or Attribute Name | Use | Description |
|---|---|---|
| mpu_sequence_number | | specifies sequence number of MPU in a single MMT asset. It is incremented by 1 and will be unique within an MMT asset. |
| number_of_au | | specifies the number of AUs in this MPU. |
| au_length | | specifies length of each AU in this MPU |
| private_header_flag | | indicates that there is private_header |
| private_header_length | | specifies the length of private_header |

TABLE 3-continued

| Element or Attribute Name | Use | Description |
| --- | --- | --- |
| MPU_delivery_characteristic_header_flag | | indicates presence/absence of MDC, if the flag is 1, MDC follows the flag |
| loss_priority | | specifies characteristics regarding packet data loss of MPU<br>11: loss priority 0 (Lossless)<br>10: loss priority 1 (Lossy, High priority)<br>01: loss priority 2 (Lossy, Medium priority)<br>00: loss priority 3 (Lossy, Low priority) |
| delay_priority | | specifies characteristics regarding delay sensitivity of MPU<br>11: high sensitivity: end-to-end delay <<1 sec (e.g., VoIP, video-conference)<br>10: medium sensitivity: end-to-end delay approx. 1 sec (e.g., live-streaming)<br>01: low sensitivity: end-to-end delay <5~10 sec (e.g., VoD)<br>00: don't care (e.g., FTP, file download) |
| class_of_service | | classifies characteristics of MPU data according to bitstream characteristics<br>111: The Constant Bit Rate (CBR) service class shall guarantee peak bitrate at any time to be dedicated for transmission of the MPU. This class is appropriate for realtime services which require fixed bitrate such as VoIP without silence suppression.<br>110: The Real-Time Variable Bit Rate (rt-VBR) service class shall guarantee sustainable bitrate and allow peak bitrate for the MPU with delay constraints over shared channel. This class is appropriate for most realtime services such as video telephony, videoconferencing, streaming service, etc.<br>101: The Non-Real-Time Variable Bit Rate (nrt-VBR) service class shall guarantee sustainable birate and allow peak bitrate for the MPU without delay constraint over shared channel such as file downloading.<br>100: The Available Bit Rate (ABR) class shall not guarantee any bitrate, but may report available bitrate for feedback control. This class is appropriate for applications which can be adaptive to time-varying bitrate such as video streaming with RTCP feedback.<br>011: The Unspecified Bit Rate (UBR) class shall not guarantee any bitrate and shall not indicate congestion. This class is appropriate for interactive applications such as Web browsing. UBR service is equivalent to the common term "best effort service". |
| hybrid_sync_indicator | | flag for synchronization, if the flag is 1, synchronization with other MPU shall not be considered, and if it is 0, synchronization with other MPU shall be considered.<br>1: no dependency.<br>0: dependent on other MPU for synchronization in hybrid delivery. |
| sustainable_rate | | The sustainable_rate defines the minimum bitrate that shall be guaranteed for continuous delivery of the MPU. The sustainable_rate corresponds to drain rate in token bucket model. The sustainable_rate is expressed in kilobits of MFU(or MPU) per second. |
| buffer_size | | The buffer_size defines the maximum buffer size for delivery of the MPU. The buffer absorbs excess instantaneous bitrate higher than the sustainable_rate and the buffer_size shall be large enough to avoid overflow. The buffer_size corresponds to bucket depth in token bucket model. Buffer_size of a CBR(constant bit rate) MPU shall be zero. The buffer_size is expressed in kilobits |
| peak_rate | | The peak_rate defines peak bitrate during continuous delivery of the MPU. The peak_rate is the highest average bit rate during every MFU period. The peak_rate is expressed in kilobits of MFU(or MPU) per second. |

TABLE 3-continued

| Element or Attribute Name | Use | Description |
|---|---|---|
| MFU_period | | The MFU period defines minimum period of MFU during continuous delivery of the MPU. The MFU period is expressed in millisecond. |
| max_MFU_size | | The max_MFU_size is the maximum size of MFU, which is MFU_period*peak_rate. The max_MFU_size is expressed in kilobits. |

As described in Table 3, the sustainable rate defines the minimum bitrate that shall be guaranteed for continuous delivery of the MPU, the buffer size defines the maximum buffer size for delivery of the MPU, the peak rate defines peak bitrate during continuous delivery of the MPU, the MFUperiod defines the minimum period of Media Fragment Unit (MFU) during continuous delivery of the MPU, and the max MFU size defines the maximum size of MFU.

Figure 5:
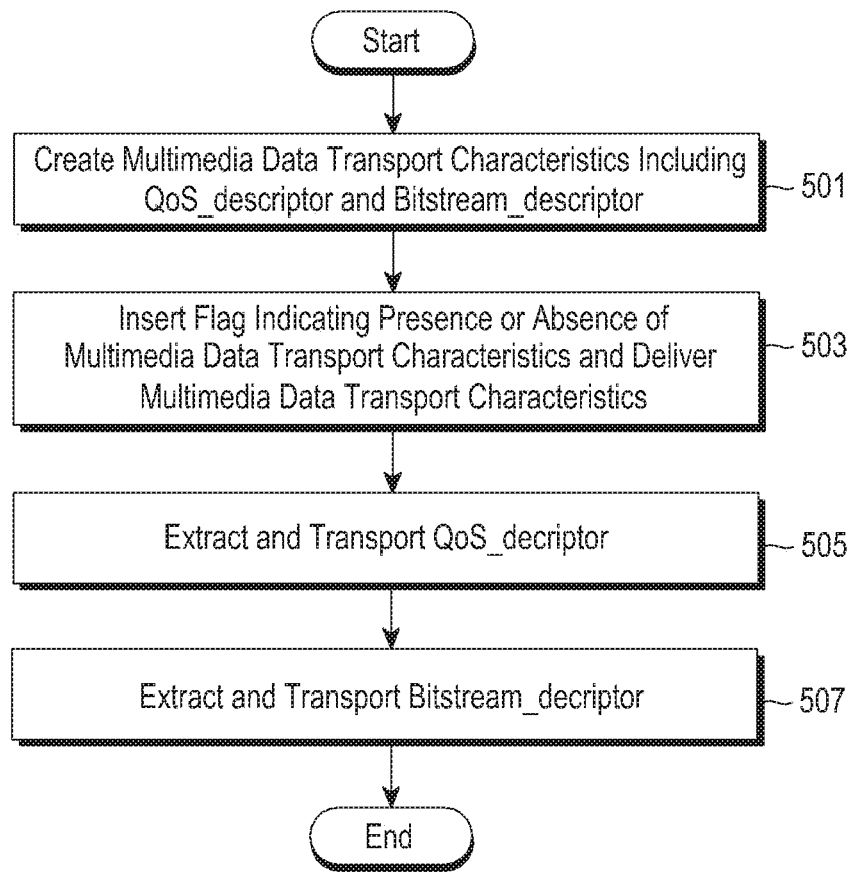
FIG. 5 is a flowchart of a method of creating and delivering transport characteristics for media data delivery in a MMT server, according to an exemplary embodiment of the present invention.

FIG. 5 is a flowchart of a method in which a MMT server creates multimedia data transport characteristics in units of MPU groups and delivers the transport characteristics to a MMT client, according to an exemplary embodiment of the present invention.

Referring to FIG. 5, the MMT server creates multimedia data transport characteristics that include QoS_descriptor indicating relative priority for each delivery packet and Bitstream_descriptor indicating information required for resource reservation in units of MPU groups (501). The QoS_descriptor and Bitstream_descriptor have been described above with reference to Tables 1 and 2, and accordingly, further descriptions thereof will be omitted.

Then, the MMT server inserts information indicating presence/absence of the created transport characteristics, in the form of a flag, into the multimedia data, also inserts the transport characteristics into the multimedia data, and then, delivers the resultant multimedia data to the MMT client (503). Operation of creating the transport characteristics, inserting them into the multimedia data, and then delivering the resultant multimedia data may be performed by the E layer 403 of FIG. 4. The multimedia data into which the transport characteristics have been inserted may be transferred to both the C layer 405 and the D layer 404.

Thereafter, the MMT server extracts the QoS_descriptor from the transport characteristics to deliver the QoS_descriptor to the MMT client (505), and extracts Bitstream_descriptor from the transport characteristics to deliver the Bitstream_descriptor to the MMT client (507). In other words, the MMT server delivers the QoS_descriptor to manage QoS for the corresponding multimedia service, and delivers the Bitstream_descriptor to reserve a resource for the corresponding multimedia service. The present exemplary embodiment relates to an example in which the MMT server sequentially performs steps 505 and 507, however, the MMT server may simultaneously perform steps 505 and 507 or may perform step 507 prior to step 505.

However, the operations or flowchart illustrated in FIGS. 4 and 5 as described above are not intended to limit the scope of the right of the present invention. In other words, the operations described above with reference to FIGS. 4 and 5 are examples about how the individual layers operate, all the operations are not necessarily performed in order to embody the present invention, and also the operations may be performed by other layers unlike the example of FIG. 4.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for receiving media data in a multimedia system, the apparatus comprising:
   a receiver; and
   at least one processor, operatively coupled to the receiver, and configured to control the receiver to receive a transmission packet including information for delivery characteristics of the media data,
   wherein the information for the delivery characteristics comprises bitstream information and quality of service (QoS) information for delivery of the media data,
   wherein the QoS information comprises a first field indicating characteristics about packet loss of the media data and a second field classifying a service class of the media data,
   wherein the bitstream information includes a first field indicating a minimum bit rate for delivery of the media data and a second field indicating a maximum buffer size for delivery of the media data, and
   wherein the transmission packet comprises a flag indicating a presence of the information for delivery characteristics.

2. The apparatus of claim 1, wherein the bitstream information further includes a third field indicating a peak bit rate for delivery of the media data.

3. The apparatus of claim 1, wherein the QoS information further comprises a third field indicating characteristics about delay sensitivity of the media data.

4. The apparatus of claim 1, wherein the service class classifies types of bitstream information indicating a constant bit rate or a variable bit rate.

* * * * *